March 27, 1934.   W. H. WOODWARD   1,952,109
COLLET CHUCK
Filed Jan. 10, 1933
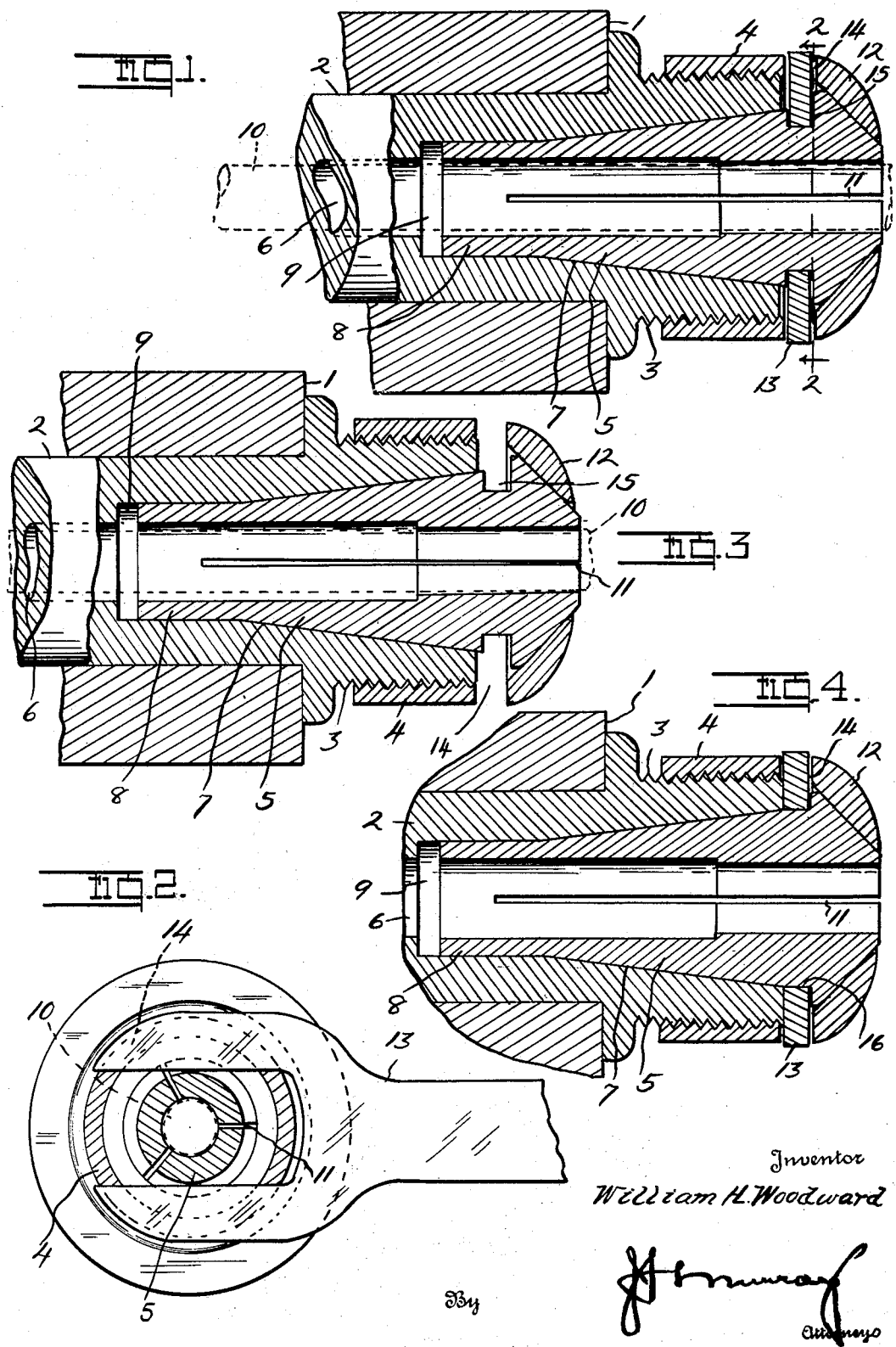
Inventor
William H. Woodward Patented Mar. 27, 1934

1,952,109

UNITED STATES PATENT OFFICE 1,952,109

COLLET CHUCK

William H. Woodward, Detroit, Mich.

Application January 10, 1933, Serial No. 651,007

9 Claims. (Cl. 279—49)

This invention relates to collet chucks, such as are employed in certain lathes and other machine tools to hold bar stock or other work, and which in some machines function as tool holders.

An object of the invention is to adapt a collet chuck to be so mounted in a tubular spindle, as to permit the opening through said spindle to be used to substantially its full diameter to accommodate bar stock or the like, gripped by said collet.

Another object is to form a collet with a contractive portion and to contract said portion jointly by a reaction between the collet and a spindle receiving it and by a reaction between the collet and a means for forcing it into the spindle.

A further object is to form a chuck collet with reversely tapered faces, one reacting with a tapered socket in the spindle to contract the collet, and the other reacting for the same purpose with a nut or other member which serves to force the collet into the socket.

Still another object is to mount a nut or its equivalent for travel on a spindle to force a collet into a socket formed in said spindle, and to withdraw the collet from the socket when the nut is unscrewed, by subjecting the collet to a tool used to turn the nut.

A still further object is to form a chuck collet with flexible jaws for gripping a tool or piece of work and to safeguard said collet against use upon a tool or work that is unduly large or small, by adapting the collet to interfere with mechanism for imposing a gripping force on the jaws, when the latter are unduly expanded through insertion of work or a tool, or are unduly contracted to initially engage work or a tool.

These and various other objects, the invention attains by the construction hereinafter described and illustrated in the accompanying drawing, wherein:

Fig. 1 is a fragmentary axial sectional view of a bench lathe head stock and the spindle thereof, showing a collet chuck applied to said spindle in accordance with the invention.

Fig. 2 is a cross sectional view of the same, taken upon the line 2—2 of Fig. 1.

Fig. 3 is a view similar to Fig. 1, but showing the effect of initially contracting the collet jaws to engage stock of lesser diameter than is suited to the illustrated size of collet.

Fig. 4 is a view similar to Fig. 1, but showing a slightly modified construction.

In these views, the reference character 1 designates a lathe headstock and 2 the tubular spindle of said headstock. The front end portion of said spindle projects beyond said headstock and has exterior screw threads 3 for engagement by a nut 4. Insertable in said spindle through its front end is a collet 5, the central opening 6 of the spindle being enlarged to form a socket 7 for snugly receiving said collet. Through its major extent, said socket is tapered acutely to its axis, and the mid portion of the collet is correspondingly tapered, so that the collet will wedge tightly in the socket, when pressed into the latter. The rear portions 8 of the collet and 9 of the socket are of corresponding cylindrical form, and serve to accurately align the axes of the collet and socket.

To provide for contraction of the collet and consequent clamping therein of a tool or bar of stock such as is indicated at 10 in Fig. 1, a major portion of the collet is divided into flexible gripping jaws by slots 11, radial to the collet and parallel to its axis. Said slots, whereof three is the preferred number, extend from the front end of the collet, fully traversing its described tapered portion and preferably extending some distance into the cylindrical rear portion 8.

The nut 4 constitutes a means for forcing the collet into the spindle socket, being formed for this purpose with an annular abutment 12, inwardly projecting at its front end, the rear face of said abutment being tapered reversely to the collet and socket taper, already described, and preferably at a considerably greater angle to the chuck axis. The front face of the collet is tapered correspondingly to said abutment, whereby the jaws of the collet are flexed inwardly by the nut, as the latter is advanced on the spindle to force the collet into its socket. Also the socket reacts upon the intermediate portions of the jaws to flex the latter inwardly.

To adapt the nut for operation by a spanner wrench 13, a pair of diametrically opposed, circumferentially elongated slots 14 are formed in the nut, preferably adjacent to the abutment 12, said slots being proportioned in width and depth to freely accommodate the wrench jaws. Between its two reversely tapered portions, the collet has an annular groove 15 of a width substantially equal to that of the slots 14, and adapted to register with said slots adequately to allow entry of the wrench jaws in said slots and groove, when the nut either engages the collet without contracting same or flexes the jaws inwardly to a slight predetermined extent, such as would effect clamping of a bar or tool of suitable diameter for use with the collet. If the inserted bar or tool is unsuitably small for the collet, the jaws of the latter will be unduly flexed inwardly, in establishing their initial engagement with said bar or tool, involving a sufficient advancement of the nut relative to the collet to destroy proper registration of the slots and groove, and thus prevent application of the wrench to the nut (see Fig. 3). If, under the described conditions, the wrench is engaged with the nut prior to undue flexure of the jaws, the wrench jaws will be clamped between the front walls of the slots and the rear wall of the groove as said slots and groove vary from correct registration and operation of the wrench will thus be prevented. In case an over sized bar or tool is inserted in the collet, the resulting undue expansion of the collet jaws will reduce the possible advancement of the nut relative to the collet and prevent establishment of such registration between the slots and groove as is essential to use of the wrench.

It is a feature of the invention that the powerful force applicable by the nut is utilized to withdraw the collet from the spindle socket, as well as to force it therein. Thus, when the wrench is employed to unscrew the nut, the inner portions of the wrench jaws exert a thrust against the front wall of the groove 15, whereby the collet is actuated from the socket.

As is common practice, there will ordinarily be provided a set of the described collets, varying only with respect to the diameter of the opening formed in the forward portions of the jaws, each member of the set being thus adapted for clamping a certain size of tool or work.

Since the flexible jaws of a chuck collet may be distorted beyond the possibility of return to their normal positions, or may even be broken, by clamping unduly large or unduly small members in the collet, it is apparent that the described provision for limiting the chuck to use with tools or work of suitable size is decidedly useful.

Application to the collet jaws of a contractive force at their free ends as well as intermediately of their length is also desirable in minimizing the effort requisite to clamp work or tools in the chuck.

That form of the invention illustrated in Fig. 4 conforms to the description already given, except that the groove 15 is replaced by an annular shoulder 16 separating the two reversely tapered portions of the collet, said shoulder receiving the forward thrust of the wrench, when the latter is employed to unscrew the nut from the spindle. In this modification, said shoulder and the front end of the spindle perform the functions of the front and rear walls of the groove 15 in preventing the clamping of unduly large or small parts, said shoulder preventing application of the wrench when the jaws are excessively expanded and the spindle extremity exercising such function upon undue contraction of the jaws.

The invention is presented as including all such modifications and changes as properly come within the scope of the appended claims.

What I claim is:

1. A chuck comprising a spindle terminally formed with a tapered socket and formed with screw threads adjacent to said socket, a collet insertable in said socket and formed with a plurality of gripping jaws inwardly flexible by the socket, a nut engageable with said screw threads and formed with an abutment effective upon the jaws as the nut is screwed on the spindle, to force the collet into the socket, said abutment being tapered reversely to the socket, to additionally act to flex the jaws inwardly, said nut having a pair of diametrically opposed openings and said collet having an annular shoulder, and a tool engageable in said openings for turning the nut, and engageable through said openings with said annular shoulder, as the nut is unscrewed from the spindle, to withdraw the collet from the socket.

2. A chuck as set forth in claim 1, said openings being slots extended circumferentially of the nut, and said tool being a spanner wrench.

3. A chuck as set forth in claim 1, the collet being formed with an annular groove one wall of which forms said annular shoulder, said groove, tool, and openings of the nut substantially conforming in width, whereby substantial registration of said groove and openings is prerequisite to use of the tool.

4. A chuck as set forth in claim 1, said spindle having an extremity spaced from and facing said shoulder of the collet, and said tool being engageable between said extremity and shoulder, when the jaws are under predetermined flexure, the openings of the nut being overlapped by said extremity or by said shoulder when the jaws are unduly flexed inwardly or outwardly, and resisting application of the tool to the nut.

5. A chuck comprising a collet having a portion contractive to grip a tool or piece of work, a spindle formed with a socket for receiving said collet and fashioned to act contractively upon the collet, in receiving same, and means for forcing the collet into the socket, comprising an actuating part and an actuable part, the former being engageable with and disengageable from the latter, said collet being fashioned to resist operative engagement of said actuating and actuable parts, when contracted beyond a predetermined limit.

6. A chuck as set forth in claim 5, said collet being fashioned to resist operative engagement of said actuating and actuable parts, when expanded or contracted beyond predetermined limits.

7. A chuck comprising a spindle formed with a socket and with screw threads adjacent to said socket, a collet insertable in said socket and formed with a plurality of inwardly flexible gripping jaws, a nut engageable with said screw threads and formed with an abutment effective upon the jaws, as the nut is screwed on the spindle, to force the collet into the socket, said abutment and jaws having their engaging faces tapered to flex the jaws inwardly, as pressure is applied through said faces, and a tool for turning said nut, the nut having an opening for receiving said tool and the collet having an annular shoulder with which said tool is engageable through said opening to withdraw the collet from the socket, as the nut is unscrewed from the spindle.

8. A chuck comprising a rotary drive member terminally formed with a tapered socket and with screw threads adjacent to said socket, a collet exteriorly tapered to fit snugly within said socket, a nut engageable with said screw threads and formed with an abutment engageable with the collet to drive the collet into said socket as the nut is advanced on said screw threads, and further formed with an opening extending between its external and internal faces, the collet having an annular shoulder, and a tool engageable in said opening for turning the nut, and engageable through said opening with said annular shoulder, as the nut is unscrewed from the drive member, to withdraw the collet from the socket.

9. A chuck comprising a spindle terminally formed with a tapered socket and with screw threads adjacent to said socket, a collet insertable in said socket and formed with a plurality of gripping jaws inwardly flexible by the socket, a nut engageable with said screw threads and formed with an abutment effective upon the jaws as the nut is screwed on the spindle, to force the collet into the socket, said abutment being tapered reversely to the socket, to additionally act to flex the jaws inwardly, said nut having an opening extending between its external and internal faces and said collet having an annular shoulder, and a tool engageable in said opening for turning the nut, and engageable through said opening with said annular shoulder, as the nut is unscrewed from the spindle, to withdraw the collet from the socket.

WILLIAM H. WOODWARD.